US005926255A

United States Patent [19]
Kimura

[11] Patent Number: 5,926,255
[45] Date of Patent: Jul. 20, 1999

[54] PHOTOGRAPHIC FILM AND PRINTING METHOD AND APPARATUS THEREOF

[75] Inventor: Tsutomu Kimura, Kanagawa, Japan

[73] Assignee: Fuji Photo Film Co., Ltd., Kanagawa, Japan

[21] Appl. No.: 08/675,050

[22] Filed: Jul. 3, 1996

[30]  Foreign Application Priority Data

Jul. 6, 1995  [JP]  Japan ................................. 7-170930

[51] Int. Cl.⁶ .......................... G03B 27/32; G03B 27/52; G03B 27/70
[52] U.S. Cl. ................... 355/40; 355/39; 355/41; 355/42; 355/43
[58] Field of Search .................. 355/39, 40, 41, 355/42, 43

[56]  References Cited

U.S. PATENT DOCUMENTS 5,093,682  3/1992  Hicks ............................................. 355/1
5,101,225  3/1992  Wash et al. .................................. 355/40
5,231,451  7/1993  Uekusa et al. .............................. 355/29
5,255,031  10/1993  Ikenoue ..................................... 354/106
5,587,752  12/1996  Petruchik ................................... 396/315
5,745,219  4/1998  DeMarti, Jr. et al. ...................... 355/40

*Primary Examiner*—Richard Moses
*Assistant Examiner*—Shival Virmani
*Attorney, Agent, or Firm*—Sughrue, Mion, Zinn, Macpeak & Seas, PLLC

[57]  ABSTRACT

A photographic film and printing method and apparatus for the film are disclosed. The apparatus comprises reading means which reads an ID number at the time of print with film processing of the photographic film having the ID number printed thereon; print data entering means which enters print data about the exposure amount; storage means which associates and stores the ID number and the print data so that the print data obtained at the time of the print with film processing is saved; exposure controlling means which reads the ID number of said photographic film, retrieves the print data which corresponds to the ID number from said storage means, and automatically controls the exposure amount based on said print data when said photographic film is reprinted. As a result, the quality of the photographic film can be maintained constant without operator's help in either case of the print with film processing and the reprint.

8 Claims, 8 Drawing Sheets

FIG. 7A

| MANAGEMENT AREA | |
|---|---|
| FID NUMBER | |
| FRAME NUMBER 1 | CORRECTION KEY INFORMATION 1 |
| FRAME NUMBER 2 | CORRECTION KEY INFORMATION 2 |
| ⋮ | ⋮ |
| FRAME NUMBER 24 | CORRECTION KEY INFORMATION 24 |

FIG. 7B

| MANAGEMENT AREA | |
|---|---|
| FID NUMBER | |
| COUNT OF FRAMES WHOSE EXPOSURE AMOUNT IS CORRECTED | |
| FRAME NUMBER 3 | CORRECTION KEY INFORMATION 3 |
| FRAME NUMBER 8 | CORRECTION KEY INFORMATION 8 |
| ⋮ | ⋮ |
| FRAME NUMBER 23 | CORRECTION KEY INFORMATION 23 |

PHOTOGRAPHIC FILM AND PRINTING METHOD AND APPARATUS THEREOF

BACKGROUND OF THE INVENTION

1. Field of the Invention

The present invention relates to a photographic film on which ID number is recorded for distinguishing the film from others, and more particularly to a printing method and apparatus of the photographic film. The printing method and apparatus can provide a desirable reprint by using the ID number recorded on the photographic film to specify the data obtained at the time of print with film processing when the reprint is effected.

2. Description of the Related Art

A negative film developed by a development process is exposed onto a photographic printing paper by a so-called 'printer processor'.

Conventionally, a printer processor measures an image density for each frame of the image at the time of print with film processing in which the negative film developed by the development process is simulaneously printed on the photographic printing paper, and the printer processor properly defines the exposure amount on the photographic printing paper based on the image density. The printer processor is also equipped with correcting means which corrects the amount of exposure in response to a key input by an operator. When the operator determines that proper amount of exposure cannot be obtained by the measured image density, the correction amount of the exposure or the like is entered by the operator through the key (i.e., the correction key), so that the amount of exposure can be corrected.

On the other hand, when the negative film which has gone through development and printing process as described above is requested for a reprint, there are much possibilities that not a few people might order the reprint of the film to another lab, or another operator who is different from the operator of the print with film processing might newly handle the reprint. In such a case, the standard for judging the amount of exposure may vary depending on the operator who handles the reprint. Therefore, there has been a drawback in that especially in a frame for which the amount of exposure based on the average image density is not proper, the finishing of the print with film processing and the reprint might make difference.

In order to solve the problem described above, the following method has been taken. Namely, correction key information is previously printed on a negative sheet bag. The correction key information indicates the correction conditions under which the exposure was corrected at the time of the print with film processing. When an order of reprint for the film is received, the reprint can be accomplished under the same conditions as those of the print with film processing by the operator entering correction key information.

However, in prior art as described above, there exists a drawback in that an operator who received the order of reprint needs to enter correction key information separately and thereby causes inconvenience to the operator. Further, it is extremely difficult for the operator to make no errors when entering the correction key information.

In view of the above-described facts, an object of the present invention is to provide a photographic film on which an inherent ID number is recorded for distinguishing the film from others.

Another object of the present invention is to provide a printing method and apparatus of a photographic film capable of maintaining the quality of the finishing of the photographic film constant without operator's help in either case of the print with film processing and the reprint. The print data which corresponds to the ID number is stored into database at the time of the print with film processing, and the printing and the exposure are effected based on the print data which corresponds to the ID number of the photographic film at the time of the reprint.

SUMMARY OF THE INVENTION

In accordance with a first aspect of the present invention, there is provided a photographic film wherein an ID number for distinguishing a film from the other is recorded on the tip end portion, or on each frame of the image, or on each cutting unit at the time of development of said photographic film.

For example, a plurality of holes are formed in a predetermined position of the tip end portion of the photographic film and the arrangement of these holes can represent the ID number. Further, preferably, the ID number can be recorded in a form of a bar code or the like in the vicinity of outside portion of each frame of the image. Moreover, when the developed film is cut to the length of several frames and accommodated in a film cover sheet, ID number may be recorded for each unit of the number of frames, for example, for each 6-frame of the image.

By making use of the photographic film of the present invention, the data obtained for the photographic film at the time of a print with film processing can be specified at the time of a reprint.

In accordance with a second aspect of the present invention, there is provided a printing method which exposes a frame image of the photographic film onto a photographic printing paper, wherein an ID number is recorded on a tip end portion of said photographic film, or on each frame of said photographic film, or on each cutting unit at the time of development of said photographic film, said method comprising the steps of: reading said ID number at the time of print with film processing in which the frame image of said photographic film is developed and exposed on said photographic printing paper; associating and storing in storage means the read ID number and the print data about the exposure conditions at the time of the print with film processing; reading said ID number at the time of reprint in which the frame image of said photographic film is exposed again on the photographic printing paper; retrieving print data which corresponds to said photographic film from said storage means based on the read ID number; and effecting the reprint of said photographic film based on the retrieved print data.

The print data must be prepared for each frame when the print data is different for each frame of the photographic film.

Further, for example, the print data itself may be the amount of exposure. However, the data length can be reduced if the print data is represented by the exposure correction amount based on the measured density of the frame.

Thus, in accordance with a third aspect of the present invention, said print data according to the second aspect of the present invention is the exposure correction information. For example, the code information about the key (i.e., the correction key information) can be used as print data when a operator can enter the exposure correction amount through key input.

Further, the second aspect can be structured as a printing apparatus.

In accordance with a fourth aspect of the present invention, there is provided a printing apparatus which exposes a frame image of the photographic film onto a photographic printing paper, wherein an ID number is recorded on a tip end portion of said photographic film, or on each frame of said photographic film, or on each cutting unit at the time of development of said photographic film, said apparatus comprising: ID number reading means which reads said ID number; print data entering means which enters print data about the exposure conditions at the time of print with film processing in which the frame image of said photographic film is developed and exposed on the photographic printing paper; storage means which associates and stores the ID number read by said ID number reading means and the print data entered by said print data entering means; print data reading means which reads the print data which corresponds to the ID number read by said ID number reading means from said storage means at the time of reprint in which the frame image of said photographic film is exposed again on the photographic printing paper; and exposure controlling means which controls the exposure of said photographic film so that the reprint of said film is effected based on the print data read by said print data reading means.

In this respect, a magnetic disk device, a magnetic optical disk device or the like which can read and write data/information may be used as storage means. ID number and print data which are stored in the storage means can be indicated for all frames of said photographic film. However, the ID number and print data can be indicated only for the frames having the exposure correction amount. In this case, exposure control means may have a structure capable of correcting the amount of exposure only for such frames.

BRIEF DESCRIPTION OF THE DRAWINGS

FIG. 7A is a view showing a first example of the data format having the FID number and the print data which are stored into database (i.e., correction key information), and FIG. 7B is a view showing a second example of the data format.

DESCRIPTION OF THE PREFERRED EMBODIMENT

With reference to the accompanying drawings, a description of the embodiment of according to the present invention will be given in detail, hereinafter.

Figure 1:
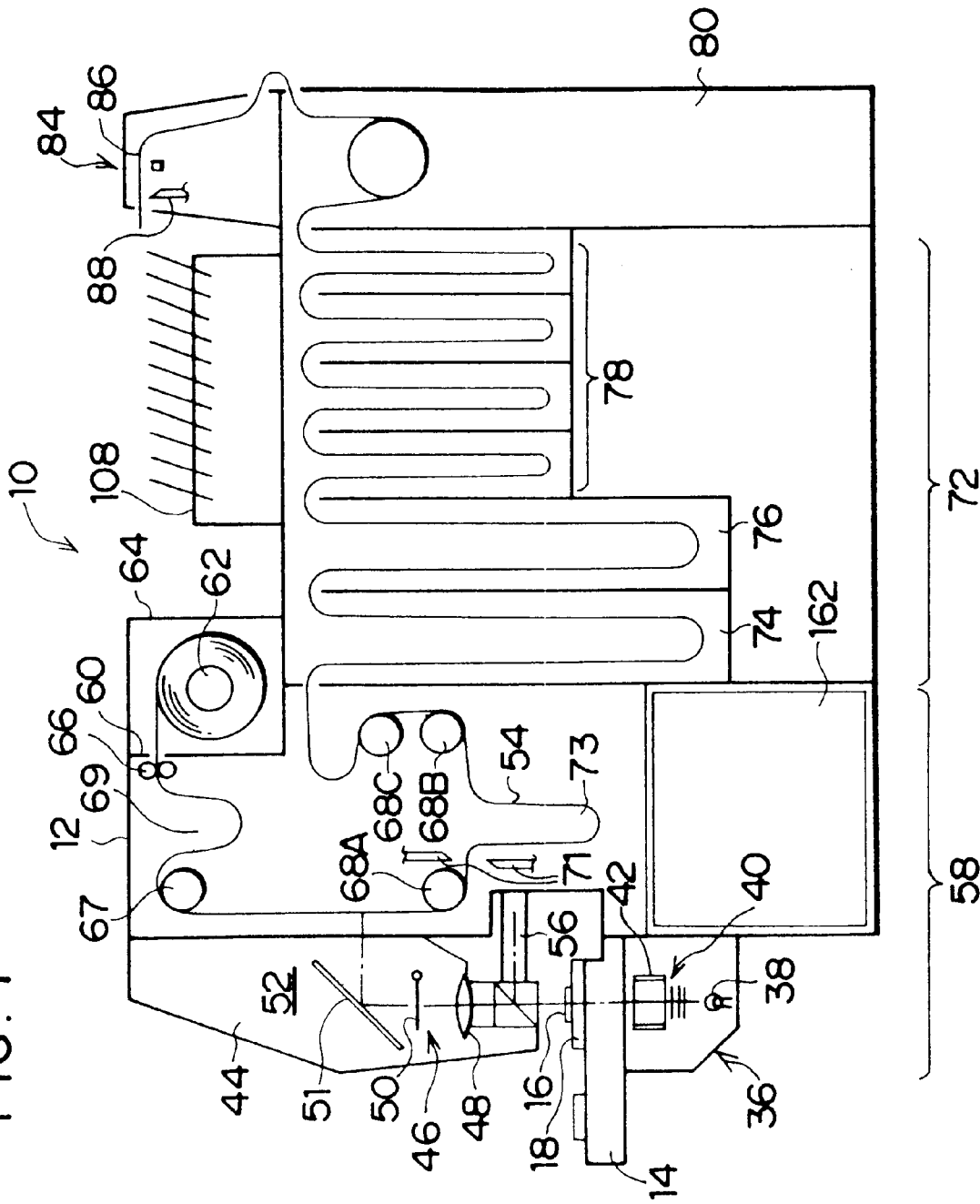
FIG. 1 is a block diagram of a printer processor according to an embodiment of the present invention.

FIG. 1 is a block diagram illustrating a printer processor 10 according to the present invention. First of all, a description of an overall structure of the printer processor 10 will be given.

The outer portion of the printer processor 10 is covered by a casing 12.

The printer processor 10 is provided with a working table 14 projecting from the casing 12 at the left-hand portion in FIG. 1. A negative film carrier 18 to which a negative film 16 is loaded is mounted on the upper surface portion of the working table 14.

A light source section 36 is equipped under the working table 14 and includes a light source 38. The light irradiated from the light source 38 is incident on the negative film 16 set on the negative carrier 18 via a filter section 40 and a diffusing tube 42. The filter section 40 has three filters, C(cyan), M(magenta) and Y(yellow) and each of them can appear or disappear on the optical axis of the light.

An optical system 46 is attached to an arm 44 positioned above the working table 14. The optical system 46 is provided with a lens 48, a shutter 50 and a mirror 51. The lens 48 and the shutter 50 are disposed on the optical axis of the above-described light. The light which transmitted through the negative film 16 passes through the lens 48 and the shutter 50 and is deflected by the mirror 51 (e.g., the light is deflected about 90 degrees), so that the image on the negative film 16 is focused on a photographic printing paper 54 which is set in an exposure room 52.

The optical system 46 also includes a density measurement apparatus 56 such as CCD or the like which measures the density of the negative film 16. The density measurement apparatus 56 is connected to a controller 162 so as to set an exposure correction value at the time of the exposure based on the data measured by the density measurement apparatus 56 and the correction key information entered by an operator.

A printing process is allowed by the light source section 36, the optical system 46 and the exposure room 52 and these form an exposure section 58.

An attachment portion 60 is provided at the corner of the upper right surface portion of the arm 44 and the upper surface portion of the casing 12. The attachment portion 60 is attached by a paper magazine 64 which is able to accommodate the photographic printing paper 54 such that a reel 62 disposed in the paper magazine 64 takes up the paper in layers.

A roller pair 66 is disposed in the vicinity of the attachment portion 60 and is able to nip and transport the photographic printing paper 54 to the exposure room 52 in the longitudinal direction of the printing paper 54. The photographic printing paper 54 is passed around a roller 67 adjacent to the arm 44 and the direction thereof is changed 90 degrees so as to be suspended. Further, a first stock portion 69 which guides and keeps the photographic printing paper 54 in a substantially U-shaped configuration is provided between the roller pair 66 and the roller 67.

A plurality of rollers 68A, 68B and 68C are disposed under the exposure section 58 of the exposure room 52. In the exposure room 52, the direction of the photographic printing paper 54 with the image of the negative film 16 printed thereon is changed substantially 90 degrees and transported to a color processing section 74 of a processor section 72 in the vicinity of the exposure section 52.

A cutter 71 is disposed downstream of the roller 68A and cuts the trail end portion of the photographic printing paper 54 which has gone through the exposure process. Therefore, the remaining photographic printing paper 54 within the exposure section 58 may be rewound around the paper magazine 64.

Further, a second stock portion 73 which guides and keeps the photographic printing paper 54 with the image printed thereon in a substantially U-shaped configuration is provided between the roller 68A and the roller 68B. The second stock portion 73 stocks the photographic printing paper 54 so as to compensate the difference in the processing times between the exposure section 58 which exposes the photographic printing paper 54 and the processing section 72 which effects the processes of developing, fixing and washing.

The color processing section 74 effects the developing process by immersing the photographic printing paper 54 in a developing solution. The photographic printing paper 54 which has finished the developing process is transported to a bleach-fix section 76 adjacent to the color processing section 74. The bleach-fix section 76 effects the fixing process by immersing the photographic printing paper 54 in a fixing solution. The photographic printing paper 54 which has finished the fixing process is transported to a rinsing section 78 adjacent to the bleach-fix section 76. The rinsing section 78 effects a washing process by immersing the photographic printing paper 54 in the rinsing water.

The photographic printing paper 54 which has finished the washing process is transported to a drying section 80 adjacent to the rinsing section 78. The drying section 80 makes the photographic printing paper 54 dry by passing the paper around the roller disposed therein and by exposing the paper the high temperature air.

A roller pair (not shown) clamps the photographic printing paper 54 which has finished the drying process and discharges the same from the drying section 80 at a constant rate. A cutter section 84 is disposed downstream of the drying section 80. The cutter section 84 includes a cut-mark sensor 86 which detects cut-mark given to the photographic printing paper 54 and a cutter 88 which cuts the photographic printing paper 54 such that the paper 54 is cut for each image and is discharged to outside portion of the casing 12 of the printer processor 10.

The photographic printing paper 54 which has been cut as described above is sorted at a sorter section 108 and blurred print or the like (which is so-called 'defective print') is picked up in a test operation. Thereafter, the finished photographic printing paper 54 is sent back to a customer together with the negative film 16. In addition, the negative film 16 is cut to a length of 6-frame of the image and is given back to a customer in a state in which films which have been cut are accommodated in a regular bag which is called a 'negative sheet'.

Figure 2:
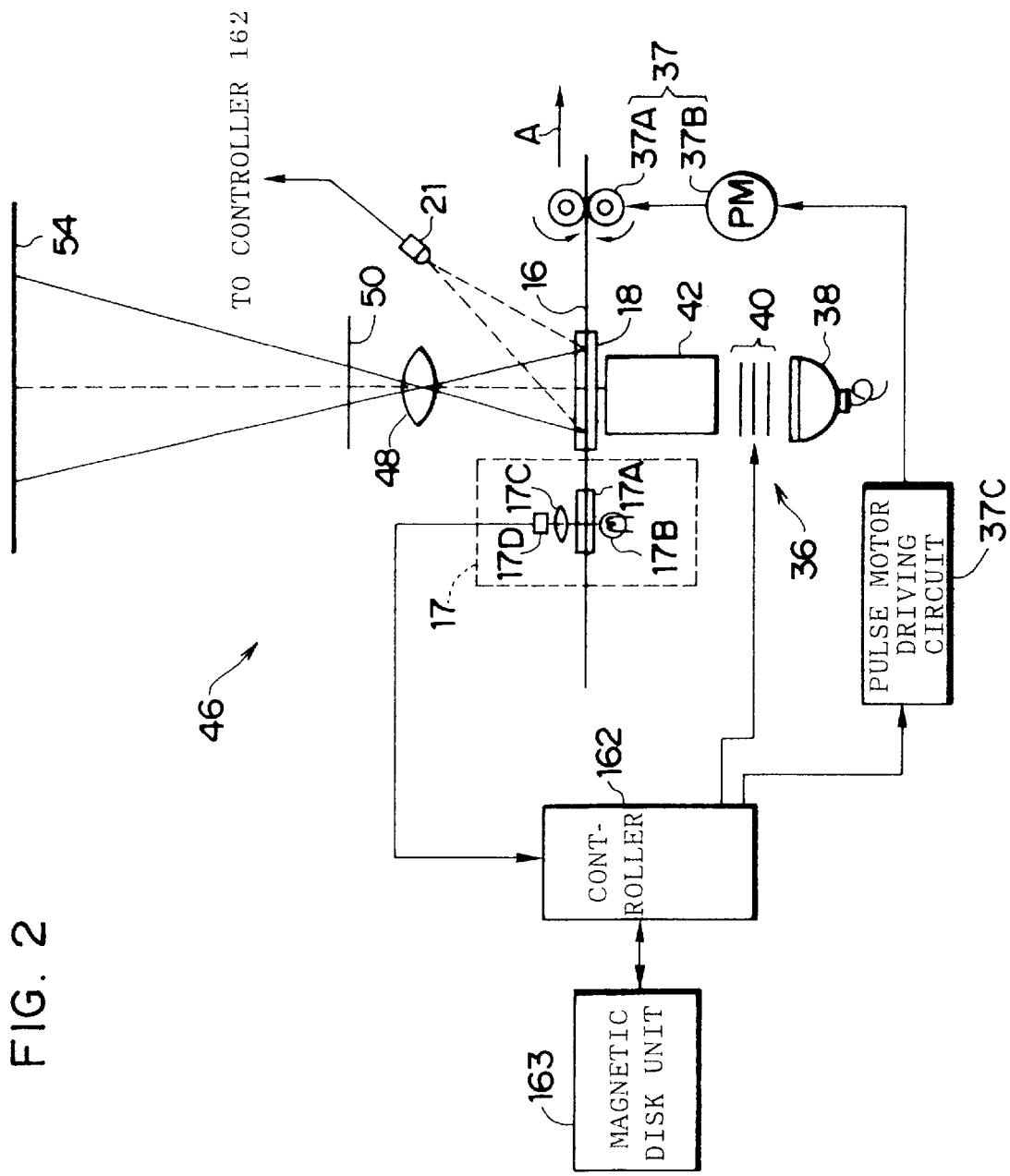
FIG. 2 is a block diagram illustrating the details of a light source section and an exposure section of the printer processor according to the embodiment of the present invention.

A description of the exposure section 58 in the printer processor 10 described above, especially of a portion which consists of the light source section 36 and the optical system 46 within the exposure section 58 will be given in detail hereinafter with reference to FIG. 2. In FIG. 2, the mirror 51 is not illustrated.

As illustrated in FIG. 2, a photometric device 21 is disposed above the negative carrier 18 such that the photometric device 21 has a direction tilted with respect to the optical axis of the light irradiated from a lamp house 38, and is positioned so as to be able to measure the intensity of the light of the image recorded on the negative film 16. The photometric device 21 consists of a 2-dimensional image sensor or the like and is able to divide the recorded image on the negative film 16 into a large number of pixels and resolve the light which transmitted each pixel into respective component colors such as R, G, and B, so that the amount of the light of each component color can be measured. Although it is not shown, the photometric device 21 is connected to a controller 162 for controlling the printer processor 10 and outputs the photometric value resulted from the measurement described above to the controller 162.

A data reading section 17 and a transporting section 30 are also disposed respectively adjacent to end portions of the negative carrier 18 so as to interpose the negative carrier 18 therebetween.

The data reading section 17 includes a reading stage 17A which clamps the negative film 16, a light source lamp 17B disposed below the reading stage 17A, a lens 17C disposed above the reading sage 17A, and a sensor 17D disposed above the lens 17C. The light irradiated by the light source lamp 17B transmits the negative film 16 and is enlarged by the lens 17C or the like, and incident upon the sensor 17D. The sensor 17D has a CCD or the like and sends the sensed image having the data recorded in a predetermined position of the negative film 16 to the controller 162. Moreover, as the description will be given later, the data which is read at the data reading section 17 is an ID number (i.e., FID number) for distinguishing the negative film 16 from others or an extension DX code or the like for specifying the frame number of the negative film 16.

A transporting section 37 includes a transport roller pair 37A which clamps the negative film 16 and a pulse motor 37B which drives the rollers. When the transport rollers 37A is rotated by the pulse motor 37B, the negative film 16 is transported toward the direction indicated by the arrow A in FIG. 2. The pulse motor 37B is connected to the controller 162 via a pulse motor driving circuit 37C.

Figure 3:
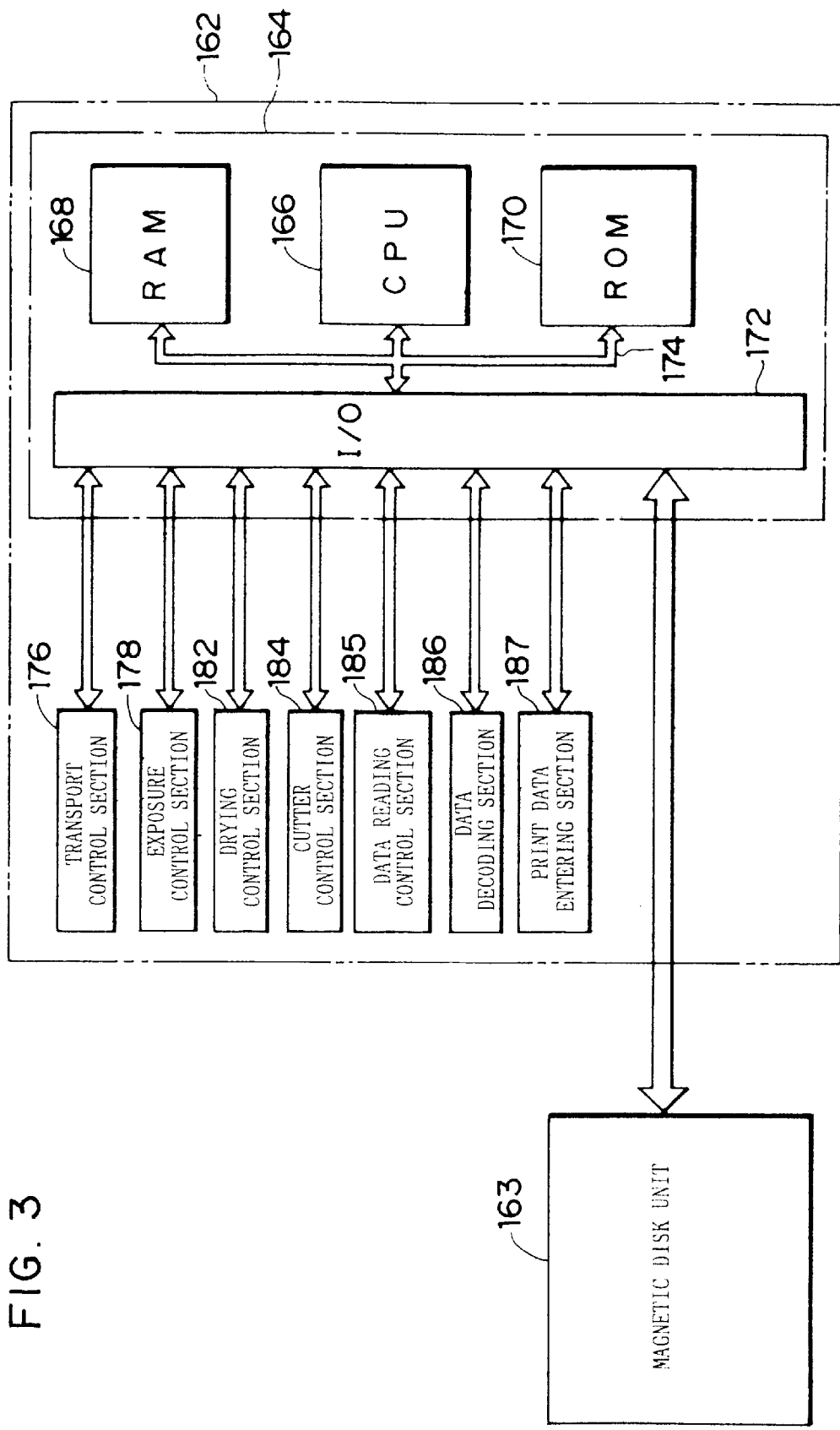
FIG. 3 is a block diagram illustrating the details of a controller of the printer processor according to the embodiment of the present invention.

As illustrated in FIG. 3, each of the control sections is controlled by the controller 162. The controller 162 is equipped with a microcomputer 164. The microcomputer 164 includes CPU 166, RAM 168, ROM 170, input/output port 172 and a bus 174 such as a data bus, a control bus or the like which interconnects CPU 166, RAM 168 and ROM 170 and input/output port 172 which are described above. The microcomputer 164 is connected to a transport control section 176 for controlling a transport system of the negative film 16 and the photographic printing paper 54 in the printer processor 10 and also to an exposure control section 178 for controlling an exposure system operations such as driving of the light source 38 in the exposure section 58, disposing filters in the filter section 40 on the optical axis, forwarding of frames on the negative carrier 18, switching of the shutter 50 or the like.

Further, the controller 162 is connected to a dry control section 182 which controls driving a fan and a heater at the drying section 80 and also to a cutter control section 184 which is disposed downstream of the drying control section 182 and controls detecting cut-marks by the cut-mark sensor 86 in the cutter section 84 and cutting the photographic printing paper 54 by the cutter 88.

The microcomputer 164 is also connected to a data reading control section 185 which controls the reading data section 17 so that FID number which is recorded at a predetermined position of the negative film 16 is input.

Further, the control sections described above are respectively connected to a predetermined portion within the printer processor 10 disposed outside of the controller 162. For example, the transport control section 176 is connected to the pulse motor driving circuit 37C or the like, the exposure control section 178 is connected to the photometric device 21 or the like, and the data reading control section 185 is connected to the data reading section 17, respectively.

The microcomputer 164 is also connected to a print data decoding section 186 which decodes the input FID number and/or the input extension DX code to be converted into machine-readable codes. The coded FID number is transmitted to CPU 166 via the input/output port 172.

The microcomputer 164 is also connected to a print data entering section 187 to which the print data at the time of exposure is entered. The print data consists of a correction key information or the like which is the information about the correction amount of exposure obtained through the measurement by the density measurement apparatus 56.

The controller 162 is constructed as described above also connected to a magnetic disk unit 163 which serves as an external storage capable of writing/reading data based on the instructions from the microcomputer 164. Alternatively, the controller 162 may be provided with other storage such as a magneto-optic disk storage or the like which is also able to write/read data.

Next, the description of the process based on the print data of the printer processor 10 according to the present embodiment will be given.

First of all, the description of the process of the printer processor 10 at the time of print with film processing will be given with reference to FIG. 4.

When the negative film 16 is set in the printer processor 10, the data reading section 17 reads FID number recorded at a predetermined position of the negative film 16 (Step 200). The read FID number is coded by the data decoding section 186 and stored in RAM 168 in the microcomputer 164.

Figure 5:
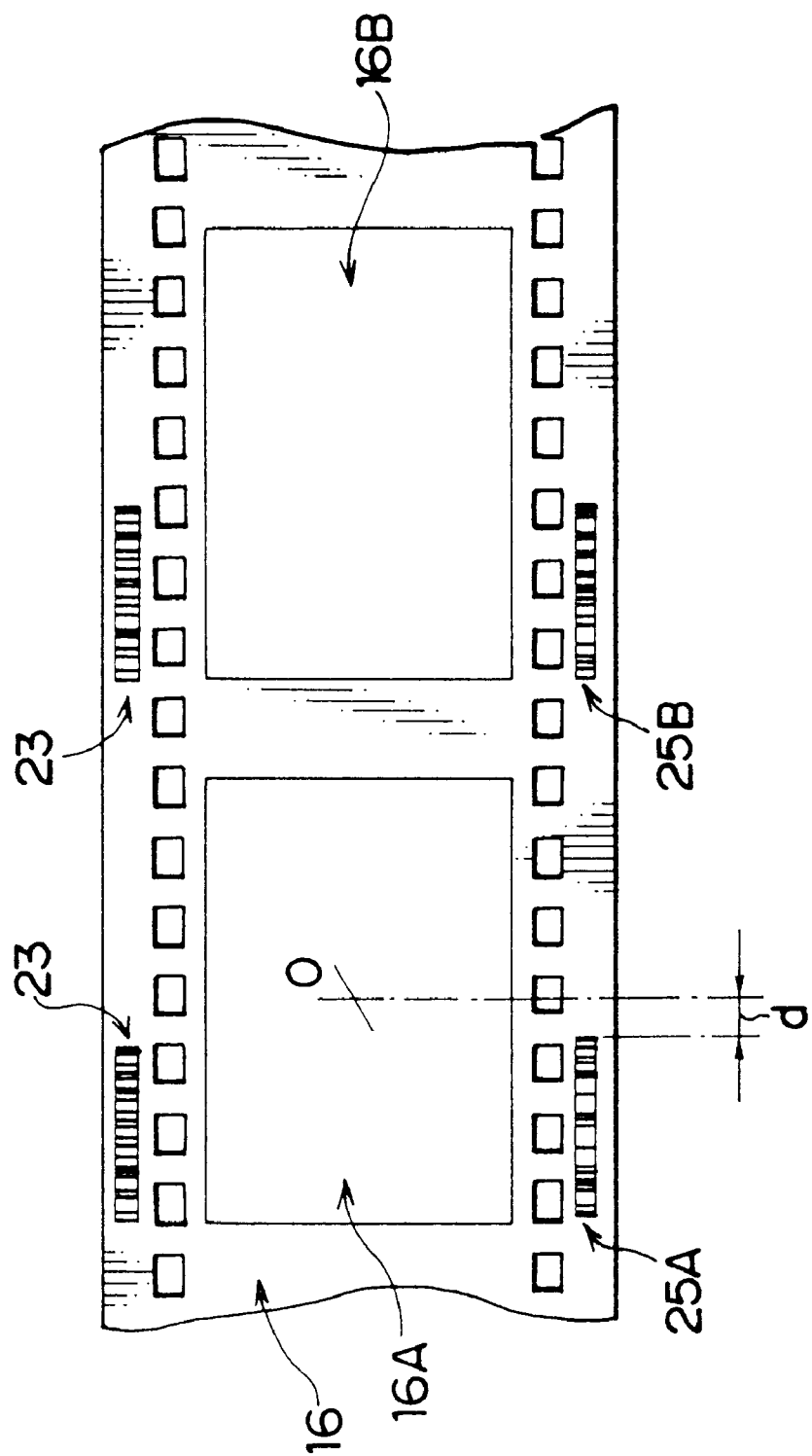
FIG. 5 is a front view showing a first example of the recording position and the representing method of FID number recorded on a photographic film.

Hence, instances regarding where to record and how to represent FID numbers recorded on the negative film 16 are shown in FIG. 5. As illustrated in FIG. 5, FID numbers 23 are represented in a form of bar code and are disposed at a position where the frame number was conventionally recorded. Each of the FID numbers 23 is disposed outside of the sprocket holes and at the upper left portion of each frame (e.g., frame 16A and a frame 16B). Further, The FID number 23 is recorded as a latent image in a film factory and can be read when it is developed.

Figure 6:
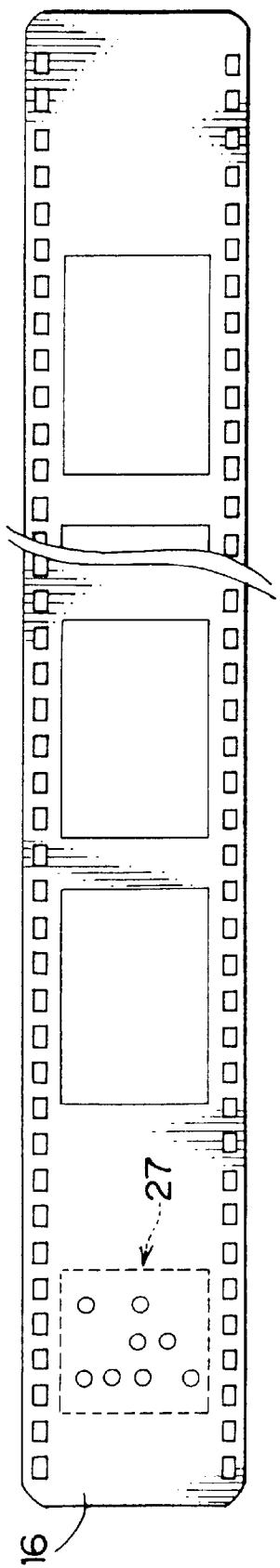
FIG. 6 is a front view showing a second example of the recording position and the representing method of FID number recorded on the photographic film.

As shown in FIG. 5, preferably, the same FID number is given for each frame. However, as earlier mentioned, because the negative film 16 is cut to a length of 6-frame and accommodated in a predetermined bag which is called a "negative sheet", a FID number can be given for each negative film cut unit. Moreover, in a case in which the negative film 16 is not cut into some frames when it is returned to a customer, an arrangement of holes 27 formed in a predetermined position at the tip end portion of the negative film 16 may represent the FID number, as shown in FIG. 6. In any case, the position and the representing method of the FID number can be changed optionally.

Next, a printing and exposure process is effected such that the image which is developed on the negative film 16 which has gone through a development process is printed on a photographic printing paper for each frame (Step 202). The amount of exposure in Step 202 is usually determined only by the negative film density of the frame which is measured by the density measurement apparatus 56. However, in the frame having the density value far apart from the average density value, the amount of exposure based on the measured negative film density causes under-exposure or over-exposure. Hence, if an operator determines that the amount of the exposure is not proper, the amount of exposure can be corrected by the operator through the correction key input.

As the printing operation proceeds for each frame in Step 202, the print data for each frame about the amount of exposure is entered to the microcomputer 164 via the print data entering section 187 (Step 204). The print data includes the information about the correction amount of exposure in step 202, for example, strings of the correction key code or the like. In this respect, the frame in which the amount of exposure is not corrected may be represented by a code which is different from a correction key code. The input print data is stored in RAM 168 via the input/output port 172.

In this respect, a frame number must be attached to each frame in order to correspond each frame to respective correction key information,. For example, as illustrated in FIG. 5, an extension DX code 25A or an extension DX code 25B are recorded in a form of bar code and positioned outside of sprocket holes formed at the lower left portions of each frame. Each of the frame numbers is specified by the code.

The photographic printing paper 54 which has finished exposure is transported to the color developing section 74 in the processor section 72 and is subjected to a developing and fixing process (Step 206). After being washed and dried, the photographic printing paper 54 which has experienced the developing and fixing process is cut to one frame length and discharged outside portion of the casing 12 of the printer processor 10 (Step 206).

The steps 202 to 206 are preceded as described above and the exposure operation or the like for all the frames of the negative film 16 is thereby completed. Subsequently to the completion of the exposure operation, according to the instructions from CPU 166, the FID number and the print data for each frame stored in RAM 168 are output to the magnetic disk unit 163 via the input/out port 172 to be stored into database (Step 208), so that the process at the time of the print with film processing is completed.

FIG. 7A illustrates an example of a data format corresponding to one of the negative films within the database prepared in Step 208. As illustrated in FIG. 7A, the management area having a management information such as data length or the like is provided at the head of the data of the negative film 16 and FID number read in Step 200 is subsequently provided therein. The correction key information 1 to 24 corresponding to the total frames 1 to 24 are indicated for each frame number, so that the data for the negative film 16 can be specified by the FID number and the correction key information can also be specified for each frame. Moreover, as earlier-mentioned, the correction key information about the frame in which the amount of exposure is not corrected have a code which is different from a key code (e.g., 0000).

In an example of FIG. 7A, correction key information are indicated for all frames. However, as illustrated in FIG. 7B, the correction key information may be indicated only about the frames in which the amount of the exposure has been corrected. In FIG. 7B, the information about the count of the frames in which the amount of the exposure is corrected is indicated between the FID number and the frame number-the correction key information, so that the range of the correction key information to be read is specified.

The description of the process of the printer processor 10 at the time of reprint will be given hereinafter with reference to FIG. 8.

When the negative film 16 is set, the FID number of the negative film is read (Step 210).

The data associating with the read FID number is retrieved from the database of the magnetic disk unit 163 (Step 212) and the print data of the negative film 16 can be read (Step 214).

Next, exposure process is performed for each frame based on the read print data (Step 216). For example, in a case in which the print data is represented as the correction key information, the microcomputer 164 sends the correction key information to the exposure control section 178. The exposure control section 178 corrects the amount of exposure determined based on the density measured by the density measurement apparatus 56 by the amount indicated by said correction key information so that the exposure section 58 is controlled to effect the exposure on the photographic printing paper with the corrected exposure amount.

In Step 216, it is necessary to make each frame correspond to each frame number in order to read the correction key information for each frame from the database. Therefore, as illustrated in FIG. 5, the frame number is detected by reading the extension DX code 25A (25B), and the frame whose central portion is spaced at a distance of 'd' from the right end portion of the extension DX code 25A (25B) in the longitudinal direction is specified as the frame 16A (16B).

Next, the photographic printing paper which has been exposed is developed and fixed (Step 218). After being washed and dried, the photographic printing paper which has experienced development and fixing is cut to each frame length and discharged outside of the casing 12 (Step 218), so that the reprint process is completed.

In this way, in the reprint process, since the exposure process is automatically implemented by using the print data obtained at the time of print with film processing and stored into the database, the finishing of the print with film processing and the reprint makes no difference without operator's help.

While this invention has been described in conjunction with a preferred embodiment thereof, it is not limited within the examples as described above. For example, although the correction key information is used as the print data, the correction amount of the exposure itself can be recorded in database as the print data.

Figure 4:
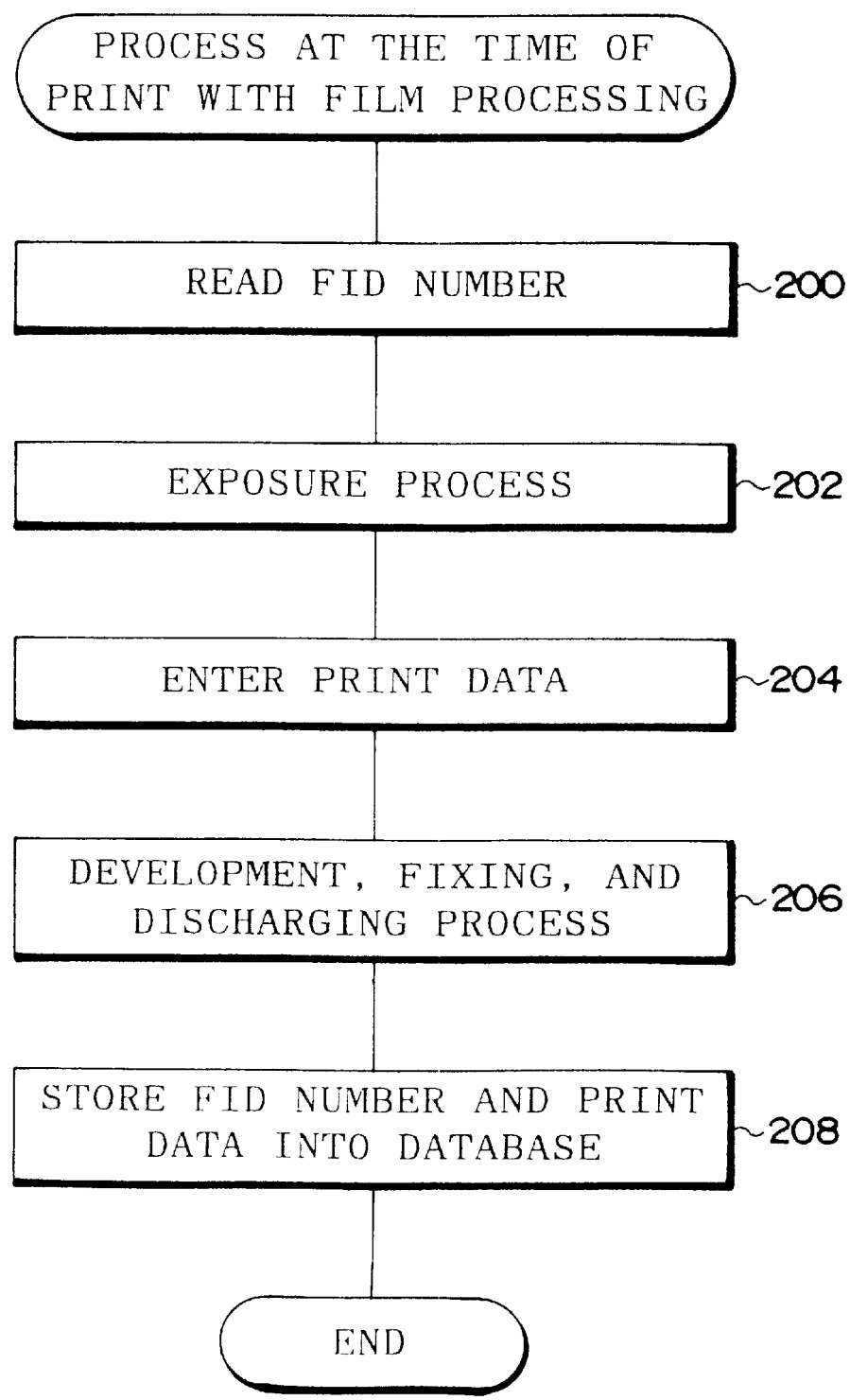
FIG. 4 is a flow chart illustrating a print with film processing process by the printer processor according to the embodiment of the present invention.
Figure 8:
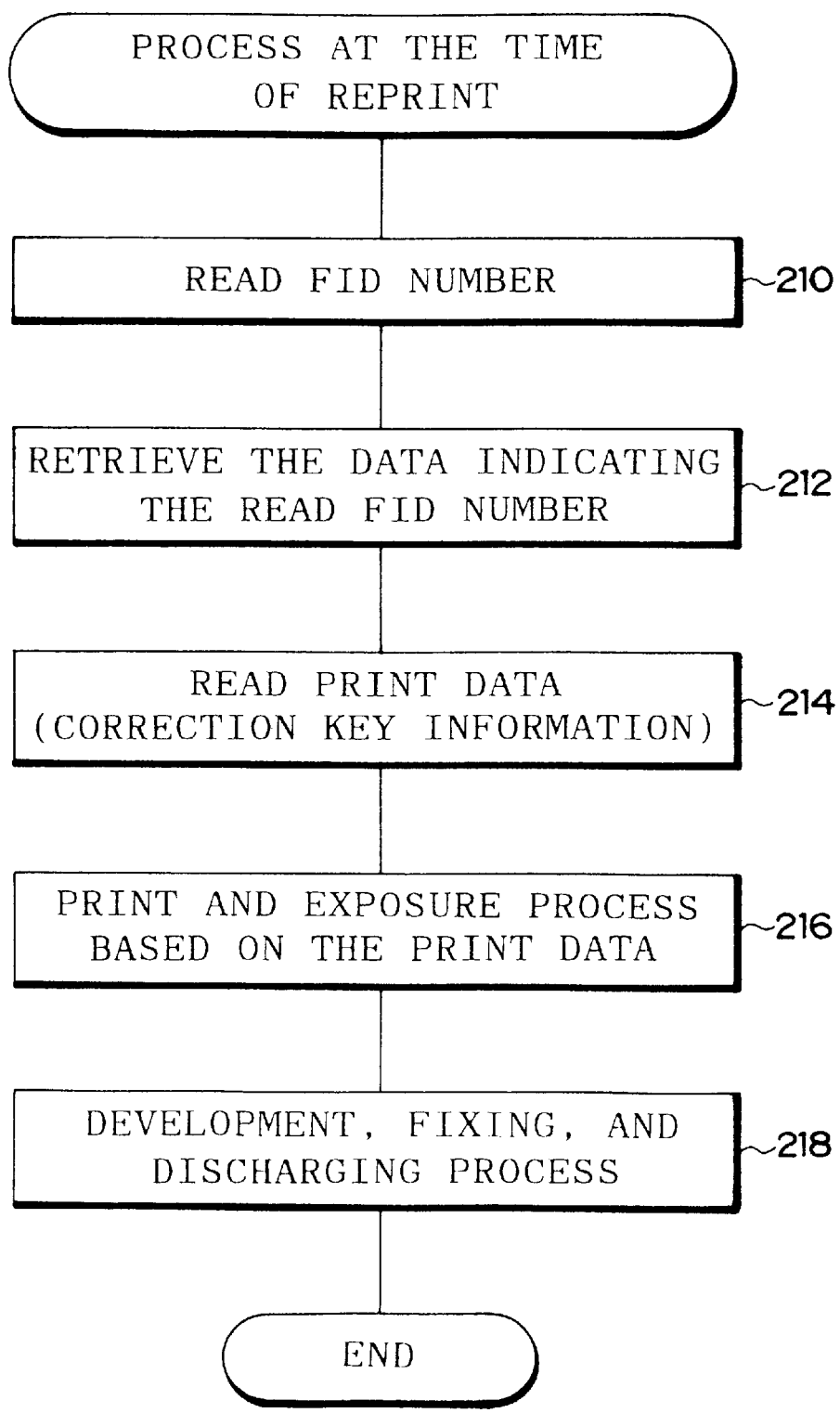
FIG. 8 is a flow chart showing a reprint process by the printer processor according to the embodiment of the present invention.

Further, the printer processor 10 is structured such that two processes which are illustrated in FIG. 4 and FIG. 8 can be implemented in either case of the print with film processing or the reprint. However, two printer processors in which one is able to effect one process may be prepared to respectively effect a print depending on the case.

In addition, the print processor in accordance with the embodiment of the present invention has been described with respect to a mini-lab which is suitable for small amount production. However, it is apparent that the present invention is also applicable to a large-lab which is suitable for large amount production.

Moreover, color negative film is used herein as the example for the description of the present invention. However, the present invention is applicable to black-and-white film.

Alternatively, each of the structures and the processing flows of the print processor used herein can be changed and modified optionally and desirably within the scope of the present invention.

As described above, in accordance with the present invention, because an ID number is recorded on a photographic film, the photographic film used at the time of the print with film processing can thereby be specified at the time of the reprint.

Further, in accordance with the present invention, since the ID number and the print data at the time of the print with film processing are stored in advance, and the print data which corresponds to the ID number of said photographic film can automatically be read at the time of the reprint so as to implement the reprint based on said print data, the quality of the photographic film can be maintained constant without operator's help in either case of the print with film processing and the reprint.

What is claimed is:

1. A printing method which exposes a frame image of the photographic film onto a photographic printing paper, wherein an ID number is recorded on a tip end portion of said photographic film, or on each frame of said photographic film, or on each cutting unit at the time of development of said photographic film, said method comprising the steps of:

reading said ID number at the time of print with film processing in which the frame image of said photographic film is developed and exposed on said photographic printing paper;

associating and storing in storage means the read ID number and the print data about the exposure conditions at the time of the print with film processing;

reading said ID number at the time of reprint in which the frame image of said photographic film is exposed again on the photographic printing paper;

retrieving print data which corresponds to said photographic film from said storage means based on the read ID number; and effecting the reprint of said photographic film based on the retrieved print data.

2. A printing method according to claim 1, wherein said print data is the information about the exposure amount.

3. A printing method according to claim 1, wherein said print data is the information about the exposure correction amount.

4. A printing method according to claim 3, wherein said associating and storing step is performed only for the frames whose exposure amount is corrected.

5. A printing apparatus which exposes a frame image of the photographic film onto a photographic printing paper, wherein an ID number is recorded on a tip end portion of said photographic film, or on each frame of said photographic film, or on each cutting unit at the time of development of said photographic film, said apparatus comprising:

ID number reading means which reads said ID number;

print data entering means which enters print data about the exposure conditions at the time of print with film processing in which the frame image of said photographic film is developed and exposed on the photographic printing paper;

storage means which associates and stores the ID number read by said ID number reading means and the print data entered by said print data entering means;

print data reading means which reads the print data which corresponds to the ID number read by said ID number reading means from said storage means at the time of reprint in which the frame image of said photographic film is exposed again on the photographic printing paper; and exposure controlling means which controls the exposure of said photographic film so that the reprint of said film is effected based on the print data read by said print data reading means.

6. A printing apparatus according to claim 5, wherein said print data is the information about the exposure amount.

7. A printing apparatus according to claim 5, wherein said print data is the information about the exposure correction amount.

8. A printing apparatus according to claim 7, wherein said storage means associates and stores said ID number and said print data only for the frames whose exposure amount is corrected.

* * * * *